(12) United States Patent
Korver et al.

(10) Patent No.: US 7,797,185 B2
(45) Date of Patent: Sep. 14, 2010

(54) VALUE DRIVEN INTEGRATED BUILD-TO-BUY DECISION ANALYSIS SYSTEM AND METHOD

(75) Inventors: Clinton Korver, Mountain View, CA (US); Katherine Ann Weller, Los Altos, CA (US); John Amos, Mountain View, CA (US); Jeffrey Belkora, Menlo Park, CA (US)

(73) Assignee: Mydecide Inc., Mountain View, CA (US)

( * ) Notice: Subject to any disclaimer, the term of this patent is extended or adjusted under 35 U.S.C. 154(b) by 1084 days.

(21) Appl. No.: 11/493,011

(22) Filed: Jul. 26, 2006

(65) Prior Publication Data

US 2006/0265276 A1 Nov. 23, 2006

Related U.S. Application Data

(63) Continuation of application No. 09/706,097, filed on Nov. 3, 2000, now Pat. No. 7,107,224.

(51) Int. Cl.
*G06Q 30/00* (2006.01)
*G06Q 99/00* (2006.01)
*G06F 17/30* (2006.01)

(52) U.S. Cl. .............. 705/10; 705/26; 705/80
(58) Field of Classification Search ........... 705/10, 705/26, 80
See application file for complete search history.

(56) References Cited

U.S. PATENT DOCUMENTS

| | | | |
|---|---|---|---|
| 4,829,426 A | 5/1989 | Burt | 364/300 |
| 5,063,522 A | 11/1991 | Winters | 395/51 |
| 5,167,011 A | 11/1992 | Priest | 395/54 |
| 5,182,793 A | 1/1993 | Alexander et al. | 395/13 |
| 5,689,652 A | 11/1997 | Lupien et al. | 395/237 |
| 5,758,328 A | 5/1998 | Giovannoli | 705/26 |
| 5,842,193 A | 11/1998 | Reilly | 706/45 |
| 5,953,707 A | 9/1999 | Huang et al. | |

(Continued)

FOREIGN PATENT DOCUMENTS

JP 2001-134635 5/2001

(Continued)

OTHER PUBLICATIONS

McCune, J.C., "Presto! A Business Plan," Success, vol. 38, No. 8, p. 59, Oct. 1991.*

(Continued)

*Primary Examiner*—Nicholas D Rosen
(74) *Attorney, Agent, or Firm*—Pillsbury Winthrop Shaw Pittman LLP

(57) ABSTRACT

A value-driven build-to-buy decision analysis system and method is provided that addresses and integrates the system analysis for multiple parts of the build-to-buy business cycle. The system and method of the present invention includes a demand component and a supply component. The demand component includes decision analysis components for one or more demand oriented activities in the build-to-buy cycle, such as selling and buying activities. The supply component includes decision analysis components for one or more supply oriented activities in the build-to-buy cycle, such as product creation, product packaging and product pricing activities. Each decision analysis component utilizes values-based object-oriented analytical models.

7 Claims, 15 Drawing Sheets

U.S. PATENT DOCUMENTS

| | | | | |
|---|---|---|---|---|
| 5,963,923 | A | 10/1999 | Garber | 705/37 |
| 5,970,252 | A | 10/1999 | Boxton et al. | 395/712 |
| 5,974,256 | A | 10/1999 | Matthews et al. | 395/705 |
| 5,974,441 | A | 10/1999 | Rogers et al. | 709/200 |
| 5,987,425 | A | 11/1999 | Hartman et al. | |
| 6,012,051 | A | 1/2000 | Sammon et al. | |
| 6,220,743 | B1 | 4/2001 | Campestre et al. | 364/468.03 |
| 6,260,024 | B1 | 7/2001 | Shkedy | 705/37 |
| 6,263,352 | B1 | 7/2001 | Cohen | 707/513 |
| 6,298,328 | B1 | 10/2001 | Healy et al. | |
| 6,493,679 | B1 | 12/2002 | Rappaport et al. | |
| 6,655,963 | B1 | 12/2003 | Horvitz et al. | |
| 6,714,937 | B1 | 3/2004 | Eynon et al. | |
| 6,735,596 | B2 | 5/2004 | Corynen | 707/102 |
| 6,751,597 | B1 * | 6/2004 | Brodsky et al. | 705/37 |
| 6,801,199 | B1 | 10/2004 | Wallman | |
| 6,963,854 | B1 | 11/2005 | Boyd et al. | 705/37 |
| 6,968,538 | B2 | 11/2005 | Rust et al. | 717/108 |
| 6,980,966 | B1 | 12/2005 | Sobrado et al. | |
| 6,996,539 | B1 | 2/2006 | Wallman | |
| 7,035,772 | B2 | 4/2006 | Etgen | 702/187 |
| 7,076,534 | B1 | 7/2006 | Cleron et al. | 709/219 |
| 7,080,371 | B1 | 7/2006 | Arnaiz et al. | 717/170 |
| 7,107,224 | B1 * | 9/2006 | Weller et al. | 705/26 |
| 7,330,826 | B1 * | 2/2008 | Porat et al. | 705/37 |
| 7,349,879 | B2 * | 3/2008 | Alsberg et al. | 705/37 |
| 7,493,277 | B1 | 2/2009 | Uhl et al. | 705/36 |
| 7,512,558 | B1 * | 3/2009 | Elad et al. | 705/37 |
| 2001/0013009 | A1 | 8/2001 | Greening et al. | |
| 2001/0014868 | A1 | 8/2001 | Herz et al. | |
| 2001/0039508 | A1 | 11/2001 | Nagler et al. | |
| 2001/0047322 | A1 | 11/2001 | Plate et al. | |
| 2002/0016759 | A1 | 2/2002 | Macready et al. | |
| 2002/0019761 | A1 | 2/2002 | Lidow | |
| 2002/0038265 | A1 | 3/2002 | Mertz et al. | 705/28 |
| 2002/0046125 | A1 | 4/2002 | Speicher et al. | |
| 2002/0111922 | A1 | 8/2002 | Young et al. | |
| 2002/0174049 | A1 | 11/2002 | Kitahara | 705/36 |
| 2002/0188488 | A1 | 12/2002 | Hinkle | 705/7 |
| 2003/0036943 | A1 | 2/2003 | Grant | |
| 2003/0167265 | A1 | 9/2003 | Corynen | 707/4 |
| 2003/0177056 | A1 | 9/2003 | Winther | 705/10 |
| 2004/0015382 | A1 | 1/2004 | Baca et al. | |
| 2004/0088239 | A1 | 5/2004 | Eder | |
| 2005/0096950 | A1 | 5/2005 | Caplan et al. | 705/7 |
| 2005/0261987 | A1 | 11/2005 | Bezos et al. | |
| 2007/0124227 | A1 | 5/2007 | Dembo et al. | 705/36 |

FOREIGN PATENT DOCUMENTS

| | | | |
|---|---|---|---|
| WO | WO 0051051 | A1 | 8/2000 |

OTHER PUBLICATIONS

Raleigh, L., "Computers Are Telling Managers How to Work Better, but Is Anybody Listening? The Hard Facts on Management Software," San Jose Mercury News, Morning Final Edition, Computing Section, p. 13F, Apr. 13, 1986.

Woodward, M.A., et al., "Analyzing and Executing Mergers and Acquisitions," Healthcare Financial Management, vol. 51, No. 5, pp. 62-64, May 1997.

Anon., "Leading Online E-Commerce and Entertainment Retailers Endorse Andromedia's LikeMinds Personalization Server 3.0," Business Wire, Jul. 15, 1999.

Dagnese et al., "Armstrong Evaluates a New Product Concept", 1997 Handbook of Business Strategy: A Comprehensive Resource Guide to Strategic Management; From long-Range Planning to Tactical Business Development, published by Faulkner & Gray.

Center for Chemical Process Safety of the American Institute of Chemical Engineers, "Tools for Making Acute Risk Decision with Chemical Process Safety Applications", Chapter 11, "Decision Analysis" (pp. 291-358), 1995.

Keeney, Ralph L., "Decision Analysis: An Overview", Operations Research, vol. 30, No. 5, (pp. 803-838) Sep.-Oct. 1982.

Green, A., "Synchronized Logistics: the 1990's Vision of Leading Personal Care Manufacturers, " Soap-Cosmetics-Chemical Specialties, vol. 67, No. 5, p. 38, May 1991.

Anon., "Controlling the Cost of the Supply Chain with KAPES," Manufacturing Systems, vol. 15, No. 3, p. 61, Mar. 1997.

Olinger, C., "A Special Breed," AS/400 Systems Management, vol. 26, No. 3, pp. 62-64, Mar. 1998.

Anon., "MAPICS: Mapics Delivers Wisdom to Midsized Manufacturers," M2 Presswire, Mar. 19, 1999.

Anon., "Perfect Launches Advanced B2B Sourcing Solution—PerfectMarket; Customers Implement PerfectMarket to Drive Evolution of Net Markets," Business Wire, Oct. 10, 2000.

Anon., "Perfect and Open Ratings Form Alliance to Provide Critical Supplier Performance Ratings to Private Exchanges and Net Markters."

Anon., "semiconbay.com Launches New Open Martketplace for the Semiconductor Industry," Business Wire, p. 315, Oct. 31, 2000.

Leeflang, Peter S. H., et al., "Building Models for Marketing Decisions:; Past, Present and Future", International Journal of Research in Marketing, Sep. 2000, 26 pages.

Walkenbach, John, et al., "Excel 5 for Windows Handbook, $2^{nd}$ Edition", PC World, Copyright 1994, 21 pages.

Delen, Dursun, et al., "An Integrated Toolkit for Enterprise Modeling and Analysis", Proceedings of the 1999 Winter Simulation Conference, Dec. 5-8, 1999, pp. 289-297.

Bhattacharjee, Sudip, et al., "Enterprise Computing Environments and Cost Assessment", Communications of the ACH, vol. 43, No. 10, Oct. 2000, pp. 75-82.

"Object-Oriented Programming", Wikipedia.com, Jun. 1, 2007, http://en.wikipedia.org/wiki/Object-oriented_programming (cited for illustrative purposes regarding the history and background of Object-oriented programming).

Leeflang, Peter S. H., et al., "Building Models for Marketing Decisions:; Past, Present and Future", International Journal of Research in Marketing, vol. 17, 2000, pp. 105-126.

Logical Decisions for Windows, logicaldecisions.com, Aug. 14, 2001, retrieved from web.archive.org, Jun. 1, 2008, pp. 1-18, http://web.archive.org/web/20010814062748/www.logicaldecisions.com/prod01.htm.

Arsham, "Probabalistic Modeling Process: Decision Analysis", University of Baltimore, Aug. 13, 2001, retrieved from web.archive.org, Jun. 1, 2008, pp. 1-32, http://web.archive.org/web/20010813161639/ubmail.ubalt.edu/~harsham/opre640a/partIX.htm.

Guttman and Maes, "Cooperative vs. Competitive Multi-Agent Negotiations in Retail Electronic Commerce", MIT Media Laboratory, 1998, pp. 135-147.

White Paper, Profit Optimization, Outcome Software, 2002, pp. 1-16.

Sornette, Didier, "Large Deviations and Portfolio Optimization", Jun. 8, 1998, available at http://arXiv.org/abs/cond-mat/9802059, 39 pages.

ProQuest Search, http://proquest.umi.com/pqdweb?RQT=532 &TS=1220355615&clientId=19649, printed Sep. 2, 2008, 2 pages.

Definition of Wizard, Perdana College of Malaysia, http://www.perdanacollege.com/library/glossary.html, printed Sep. 2, 2008, 8 pages.

Poland, William B., "Simple Probabilistic Evaluation of Portfolio Strategies", Interfaces, Linthicum, Nov.-Dec. 1999, vol. 29, Issue 6, p. 75-83.

* cited by examiner

|  | Analog | Digital |
|---|---|---|
| Total out-of-pocket cost (dollars/month) | $180 | $150 |
| Estimated calls dropped per month | 10 | 15 |
| Estimated coverage | 95% | 85% |
| Total tangible and intangible cost | $200 | $210 |

VALUE DRIVEN INTEGRATED BUILD-TO-BUY DECISION ANALYSIS SYSTEM AND METHOD

CROSS REFERENCE TO RELATED APPLICATIONS

This application is a continuation of U.S. application Ser. No. 09/706,097, filed Nov. 3, 2000 now U.S. Pat. No. 7,107,224, the entire contents of which are incorporated herein by reference thereto.

FIELD OF THE INVENTION

This invention relates to decision analysis systems and methods and, more specifically, to a value driven, integrated, build-to-buy decision analysis system and method.

BACKGROUND OF THE INVENTION

The Internet has resulted in unprecedented access to information. In the e-Commerce area, buyers of products and services are presented with a myriad of choices and are in need of decision analysis tools to help them manage the vast amount of information presented to them. For builders of products and services, there is a need for decision analysis tools that will help them make decisions related to creating and refining product and service offerings. For sellers of products and services, there is a need for decision analysis tools that will help them maximize company profits while increasing customer value.

Current providers of decision support tools generally target one of the activities in the build-to-buy business cycle. Specifically, current providers generally target one of the following: self-service buying activities; development of products (e.g., determining what product to build or service to offer, and selecting pricing, promotions, packaging, warranties, service levels, features, etc.); or selling activities. Providers that target buying activities include Active Research™ (www dot activeresearch dot com), OnLink™ (www dot onlink dot com), Ask Jeeves™ (www dot askjeeves dot com), and Blaze Software (www dot blazesoft dot com). These providers typically use recommendation engines that are either not linked to a purchaser's input, or that force purchasers to think of only particular product features.

Providers that target development of products include PeopleSoft® (www dot peoplesoft dot com), Oracle® (www dot oracle dot com), SAP™ (www dot sap dot com) HNC Software, Inc. (www dot hnc dot com), Hyperion® (www dot hyperion dot com), Blox.com™ (www dot blox dot com), and CorVu (www dot corvu dot com). These providers generally offer general-purpose business performance management products that measure return on investment (ROI) and that track organizational performance for corporate investments or activities. These products typically take a long time to implement and modify, and use inferred customer expectations.

Providers that target selling activities generally use rules-based engines that utilize a fixed set of outcomes, and that take a long time to implement and modify.

SUMMARY OF THE INVENTION

In view of the above problems in the art, the present invention provides a value-driven build-to-buy decision analysis system and method that addresses and integrates decisions for multiple parts of the build-to-buy business cycle. The system and method of the present invention includes a demand component and a supply component. The demand component includes decision analysis components for one or more demand oriented activities in the build-to-buy cycle, such as selling and buying activities. The supply component includes decision analysis components for one or more supply oriented activities in the build-to-buy cycle (hereinafter "building activities"), such as determining what products to build or services to offer, and selecting pricing, promotions, packaging, warranties, service levels, and features (hereinafter collectively referred to as "products").

Each decision analysis component utilizes object-oriented analytical models. Further, the object-oriented analytical models are values-based, meaning that they utilize information about customer values in the decision analysis. By using object-oriented analytical models, each decision analysis component can share information it gathers with other components and utilize information it receives from other components. For example, information gathered during buying activities can be directly used during building activities, and information gathered during buying and building activities can be directly used to optimize selling activities.

Object-oriented analytical models are preferably used that allow complex decisions to be structured in a pictorial manner that can be executed in software. Unlike rules-based engines, the analytical model based system and method of the present invention can show users the reasoning behind recommendations and the implications of changes.

Using the system and method of the present invention, decision analysis components can be created for a particular class of problems, and can be easily reused across multiple customers in multiple industries. This is because, by using object-oriented analytical models, generic build-to-buy functionality is separated from elements unique to specific industries and customers. This allows high degrees of customization without long and costly 20 implementation efforts.

The accompanying drawings, which are incorporated in and constitute a part of this specification, illustrate the embodiments of the invention and, together with the description, serve to explain the principles of the invention.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
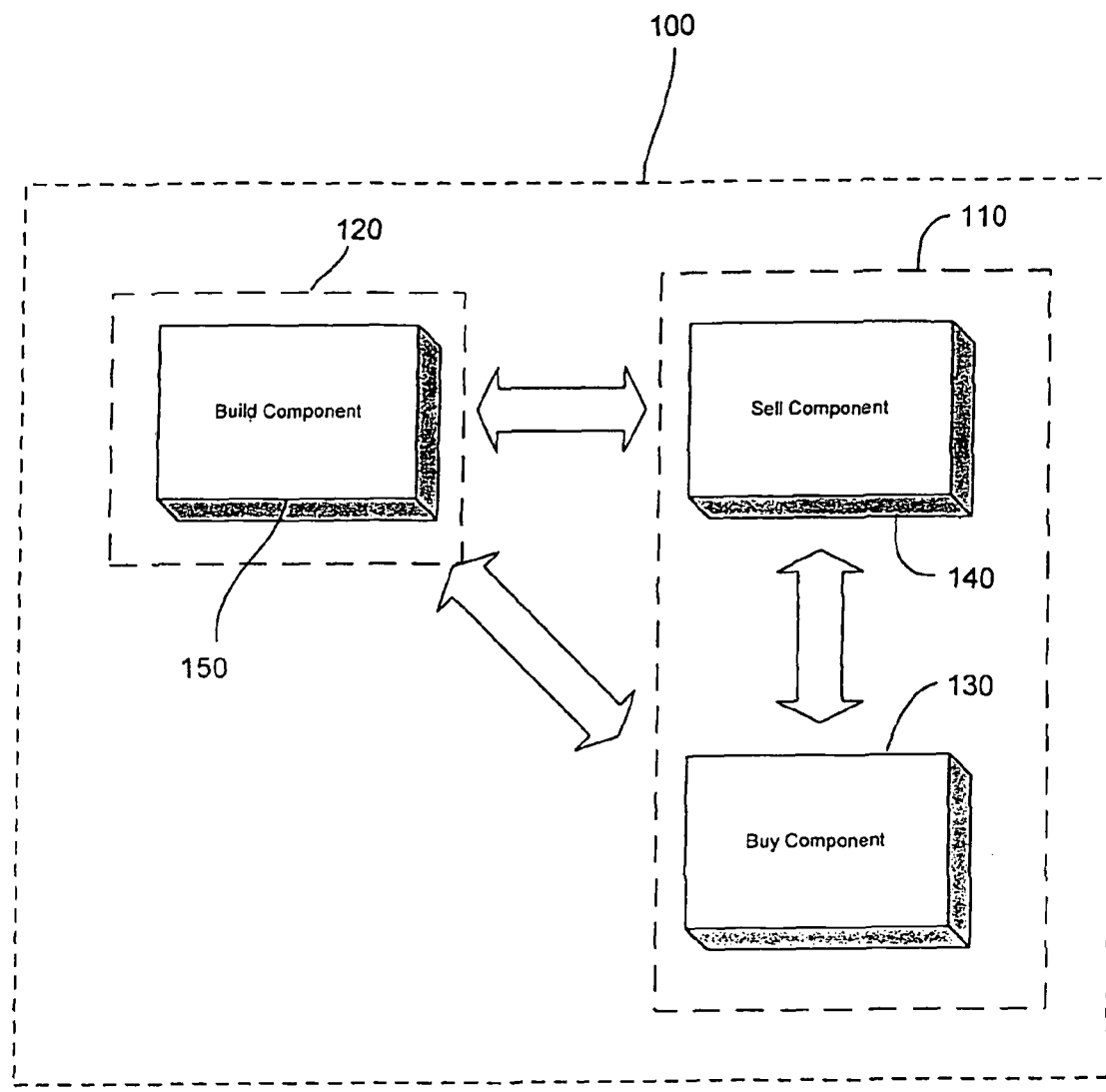
FIG. 1 is a block diagram of a value-driven build-to-buy decision analysis system, in accordance with the present invention.

FIG. 1 is a block diagram of a value-driven build-to-buy decision analysis system 100. The system 100 includes a demand component 110 and supply component 120. The demand component 110 includes decision analysis components for one or more demand oriented activities in the build-to-buy cycle. In the example shown in FIG. 1, the demand component 110 includes a buy component 130 and a sell component 140. However, if the system 100 is designed for a self-service buying application, the sell component 140 may not be needed, as will be explained in more detail below. The buy component 130 is designed to help customers make buying decisions. The sell component 140 is designed to help Customer Service Representatives (CSRs) and online automated service centers offer products and/or promotions to customers that will maximize customer value and company value.

In the example shown in FIG. 1 the supply component 120 includes a build component 150. The build component 150 is designed to help companies with building activities, such as determining what products to build and offer.

The decision analysis components 130, 140 and 150 utilize object-oriented analytical models. Further, the object-oriented analytical models are values-based models that utilize information about customer values in the decision analysis. A customer's values define what is important to the customer in making a decision. For example, a person may have many objectives in their life, such as spending time with their family, going on a nice vacation, or having a successful career. The associated objects of value for this person may include things such as money, time, and prestige. A person's set of objectives, along with their relative importance, make up his or her "values."

Companies have corporate objectives, such as increasing shareholder value, improving the lives of their employees, and contributing to the community. The associated objects of value may include things such as money, employee satisfaction, and community growth. A company's set of objectives, along with their relative importance, make up the corporate "values." In making decisions, customers need to make value tradeoffs based on the relative importance of the various objects they value.

For example, if a customer is in the market for a computer, they will have a vast number of choices available to him or her. The customer will decide which computer to buy based, in part, on his or her own set of values. For example, a customer may be willing to pay a higher price for a computer that has a fast processor because it will save the customer time. Alternatively, another customer may be willing to spend the extra time while working on the computer for a lower price. Yet another customer may place significant value on the computer's appearance, and may be willing to pay a higher price for an aesthetically pleasing computer. The object-oriented analytical models that are used for the decision analysis components 130, 140 and 150 utilize this type of "value" information in the decision analysis.

Because the analytical models used are object-oriented, each decision analysis component can share information it gathers with other components and utilize information it receives from other components. For example, information gathered during buying activities by the buy component 130 can be directly used by the build component 150 to optimize building activities, and information gathered during building activities by the build component 150 can be directly used by the sell component 140, to optimize selling activities.

The object-oriented-analytical models allow complex decisions to be structured in a pictorial manner that can be executed using object-oriented programming language, such as Java™ or C++. Unlike rules-based engines, the analytical model based system and method of the present invention can show users the reasoning behind recommendations and the implications of changes.

Using object-oriented analytical models, decision analysis components 130, 140 and 150 can be created for a particular class of problems and can be easily reused across multiple customers in multiple industries. This is because, by using object-oriented analytical models, generic build-to-buy functionality is separated from elements unique to specific industries and customers. This allows high degrees of customization without long and costly implementation efforts. Further, utilizing the same object-oriented analytical models across multiple activities of the build-to-buy cycle dramatically improves the overall cycle.

The object-oriented analytical models incorporate Decision Analysis techniques, such as those described in Decision Analysis is described in *Tools for Making Acute Risk Decisions*, Chapter 11 (Center for Chemical Process Safety of the American Institute of Chemical Engineers, 1995), and in Ralph L. Keeney, "Decision Analysis: An Overview," Operations Research, Vol. 30, No. 5, September-October 1982. Decision analysis has historically been used for addressing individual decisions (e.g., should we launch a product?; should we build a plant?; what method of removing waste from a contaminated site should we use?; should we spend money on an R&D activity?; etc.). It has not previously been implemented in the series of interrelated decisions in the build-to-buy cycle. The system and method of the present invention exhibits the following features:

(1) Information is gathered and used in a probabilistic way. The uncertainty in information is represented by probability distributions. The distribution may be represented in its mathematical form, by a discrete number of points that represent the distribution, or presented as a single point that represents the entire distribution. The method employed to represent the probability distribution depends on the sophistication of the user and the need for the probabilistic representation;

Decision models are values-based. Value tradeoffs of decision makers are assessed and presented in ways to help decision makers factor them into decisions;

Values gathered while assisting with the buy and sell decisions are used in assessing build decisions; and Analytical results are presented to the decision maker in ways that allow the decision maker to compare alternatives along dimensions of value. Outputs may include, but are not limited to, expected values, tornado diagrams, risk profiles, and sensitivity diagrams.

Figure 2:
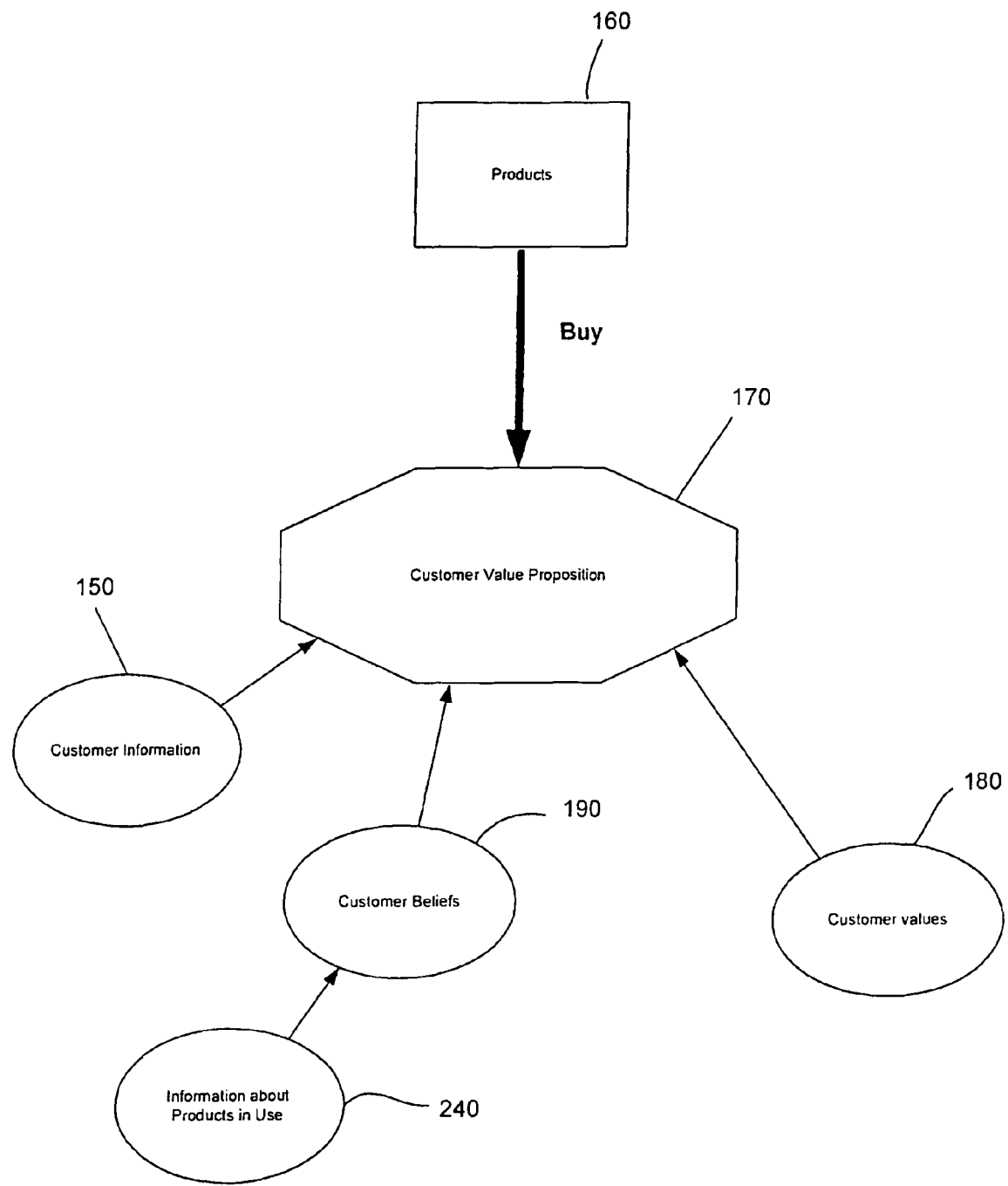
FIG. 2 is a schematic diagram of an object-oriented analytical model used for the buy component of FIG. 1.

FIG. 2 is a schematic diagram of an object-oriented analytical model used for the buy component 130 shown FIG. 1. As discussed above, the buy component 130 is used to help customers make buying decisions, such as helping the customer choose which product to buy among various competing products 160.

The model determines a customer value proposition 170 based on customer information 150, customer values 180 and customer beliefs 190. Customer information 150 is information relevant to a customer's personal characteristics, needs and likely use of the product.

As discussed above, customer values 180 define what is important to a customer in the buy decision. It should be appreciated that customer values 180 are not necessarily the same as product features. Although a customer will make some choices with regards to specific features that he or she desires in a product, they are ultimately influenced by their underlying values, which are typically more general in nature and get at why a customer likes a given feature (e.g., a customer may want the feature of power windows on an automobile, but the underlying value that makes them purchase that feature is the convenience, or time savings).

Information about Products in Use 240 is data about the products 160 being evaluated. The portion of this data that is presented to the individual customer is based on the customer information and/or customer values.

Customer beliefs 190 refer to the customer's understanding of a product or service and their own use of the product or service. These customer beliefs may be based entirely or partially on the Information about Products in Use 240. Customer beliefs can be changed, while customer values generally do not change. For example, a customer may believe, based on anecdotal or direct evidence, that a product is unreliable. The customer may have formed this belief on erroneous information. Thus, this customer belief may be changed by educating the customer. However, the value that the customer places on reliability is not affected by the customer's changing beliefs with respect to the actual reliability of the product.

Customer information 150, customer values 180 and customer beliefs 190 are used to determine the customer value proposition 170. The customer value proposition 170 is then used to help guide the customer regarding which of the products 160 to buy.

Figure 3A:
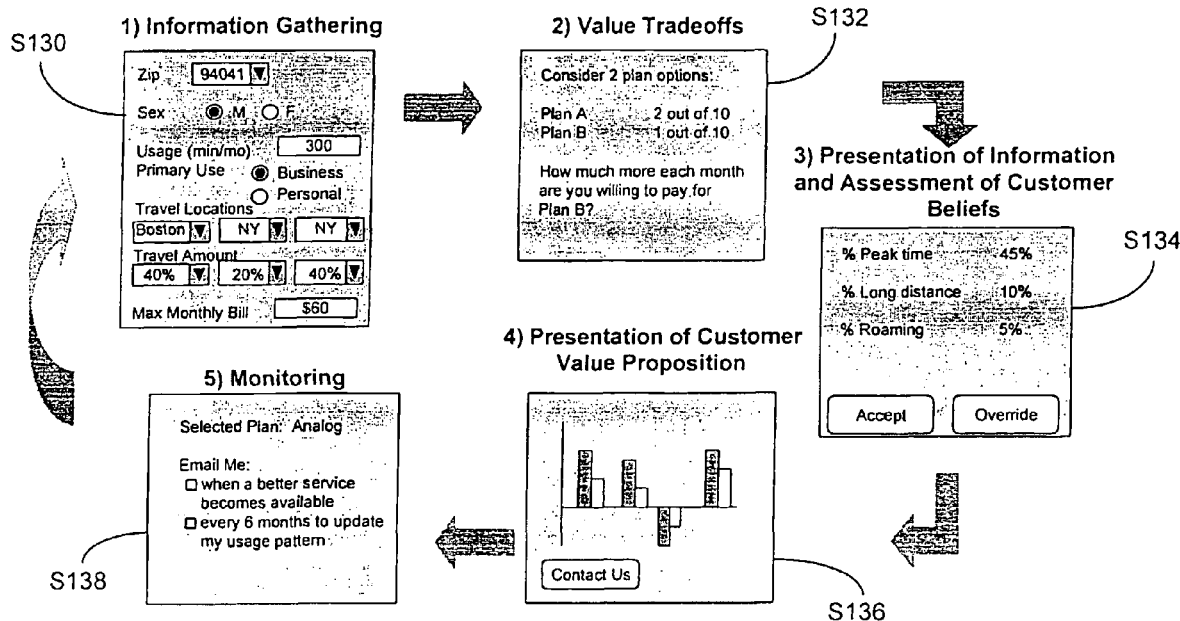
FIG. 3A is a diagram showing an example of steps that may be taken by the buy component in assisting a customer with "self-service buying" of cellular service over the internet.

FIG. 3A is a diagram showing an example of steps that may be taken by the buy component in assisting a customer with "self-service buying" of cellular phone service over the internet. Each step in FIG. 3 is illustrated as a sample screen presented to the customer.

It should be appreciated that the cellular phone service example illustrated in FIG. 3A is just one example of the types of "self-service buying" transactions that the buy component 160 can be applied to. The actual tasks performed in each step may vary greatly depending on the specific product and type of decision to which the system is tailored. In this example, the products 160 available to the customer are digital and analog service.

In step S130, information gathering is performed, in which the customer is asked to input information about themselves, their needs, and their likely use of the product. In the cellular example shown, the customer is asked to input the following information:

The zip code of the area in which the customer will primarily use the service;

The minutes per month the customer will use the phone service;

Whether the phone is primarily for business or personal use;

Where the customer travels and the percentage of their total time they spend in these areas; and The maximum amount per month the customer can spend on the service.

In step S132, information about the customer's values (180) is obtained and assessed. In the example shown, the values the customer places on cost, quality (in terms of number of calls that get dropped), and coverage (in terms of how often the service is available) get assessed. In order to make a meaningful comparison between the intangible values of "quality" and "coverage" with the tangible value of "cost", the customer is preferably asked to provide information designed to assess their willingness to pay to get increased coverage. The following are examples of questions that may be asked of the customer:

With all service providers, occasionally calls are "dropped" and you have to re-dial to connect with the other party. To measure how important continuous service is to you, consider plans A and B. Under Plan A, an estimated 2 out of 10 calls you will make each day will be dropped. Under Plan B, an estimated 1 out of 10 calls will be dropped. Estimate how much, if any, more per month you would be willing to pay for Plan B; and (2) The areas in which your-cell phone will work will vary by provider. To measure how, important coverage is to you, consider plans A and B. Plan A will provide you with coverage on an estimated 8 out of 10 calls you want to make each day. Plan B will provide you with coverage on an estimated 9 out of 10 calls. Estimate how much, if any, more per month you would be willing to spend for Plan B.

Although, in the example shown, the customer is queried to obtain information about the customer's values, it should be appreciated that customer values could also be obtained by other means, such as analyzing already existing data (e.g., already existing data on the customer's prior purchases).

In step S134, the customer's beliefs are assessed and Information About Products in Use 240 is presented to the customer. The buy component presents the Information About Products in Use 240 that is relevant to the individual customer, based on the information gathered at step S130. Information About Products in Use 240 is data regarding the alternatives that the customer is evaluating. For the cellular example shown in FIG. 3, this preferably includes:

(1) The coverage (availability of service) and quality (% of calls dropped) for various types of service;

(2) The typical usage pattern for customers, depending on business or personal use (e.g., percentage of total calls made at peak time, percentage of total calls that are long-distance, and percentage of total calls made out of the local area); and (3) The costs of services (e.g., monthly fee, long-distance fee, roaming fees, peak-time surcharges, etc.).

The customer can accept the information presented at step S134, or modify it with an override as a representation of their beliefs about the product and the customer's own use of it. However, the customer is preferably not allowed to modify the coverage, quality, or cost data, as that information does not depend on personal situations, but only on the plan selected. In the sample screen shown in step S134, the customer is presented with item (2) above, i.e., estimated usage pattern (percentage of total calls made at peak time, percentage of total calls that are long-distance, and percentage of total calls made out of the local area).

At step S136, the buy component 130 presents the customer with a quantitative measure and graphical representations of the customer value proposition 170 for each cellular service alternative. For each cellular service alternative, the following is preferably presented:

(1) Total monthly out-of-pocket costs;
(2) Estimated number of calls that will be dropped based on the customer's usage pattern;
(3) Estimated percentage of time the customer will have coverage available, based on the customer's usage and travel patterns;
(4) Total cost, including the out-of-pocket costs, and the intangible costs (based on the customer's willingness to pay) of having no coverage and experiencing dropped calls;
(5) Graphics, preferably including standard decision analysis outputs, such as a "components of value" chart, a tornado chart and a risk profile.

Figure 3B:
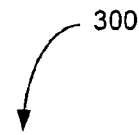
FIG. 3B is a table, produced by the buy component of FIG. 2, listing tangible and intangible customer costs for the cellular service example shown in FIG. 3A.

FIG. 3B shows a sample table 300 for presenting the information in item (4) above. The sample table 300 shown in FIG. 3B shows, for both analog and digital service: (1) total out-of-pocket costs; (2) estimated number of calls that will be dropped per month; (3) the estimated coverage, expressed as a percentage; and (4) the total of the tangible and intangible costs. As discussed above, a monetary value is assigned to the intangible costs (coverage and dropped calls) based on the customer's responses to the questions posed in step S132 (FIG. 3A).

Figure 3C:
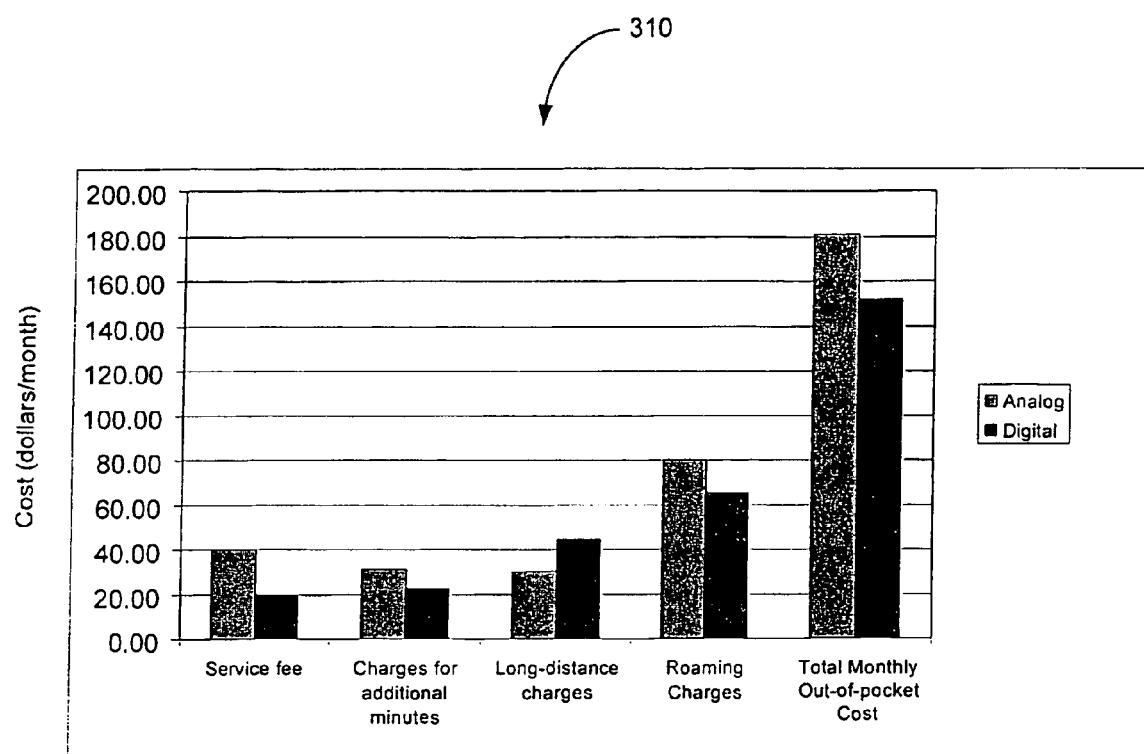
FIG. 3C is a components of value chart, produced by the buy component of FIG. 2, for the cellular service example shown in FIG. 3A.

FIG. 3C shows a sample "components of value" chart 310 preferably created at step S136 of FIG. 3A. The chart 310 shows, for both analog and digital service, a breakdown of the total out-of-pocket cost per month. The breakdown shown in FIG. 3C includes service fees, charges for additional minutes, long distance charges, and roaming charges. The chart also shows, in graphical form, the total out-of pocket cost for both analog and digital service.

Figure 3D:
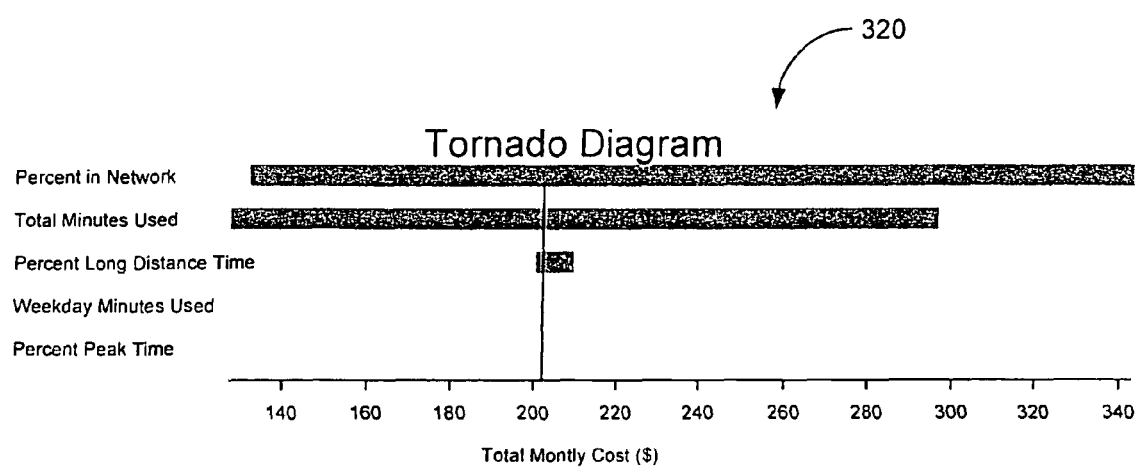
FIG. 3D is a tornado chart, produced by the buy component of FIG. 2, for the cellular service example shown in FIG. 3A.

FIG. 3D shows a tornado diagram 320, preferably created at step S136 of FIG. 3A. The tornado diagram 320 shows that the percent time spent calling inside the network and the total minutes used are the two greatest factors driving the total monthly cost. The diagram displays a bar for each variable used to calculate the total monthly cost. The variables used to calculate the monthly cost in the example shown are "Percent in Network" (time spent calling inside the network), "Total Minutes Used", "Percent Long Distance" (time spent calling long distance), "Weekday Minutes Used", and "Percent Peak Time" (time spent calling during peak times).

The bars show how total monthly cost varies over a range of values of the variable. The range that is used is derived from probabilistic information that the user inputs or is obtained by the system connecting to a data source. The ends of the range usually represent the $10^{th}$ and $90^{th}$ percentiles of a probability distribution. As an example, the total monthly cost is $130, when the "Percent in Network" (time spent calling inside the network) is low, but $340 when the "Percent in Network" is at its highest value. The bars are ordered based on the impact of the range for a variable on the total monthly cost, with the variable with the most impact on the top and the variable with the least impact on the bottom. For a variable that has no bars, the total monthly cost does not vary over the range of inputs for that variable.

Figure 3E:
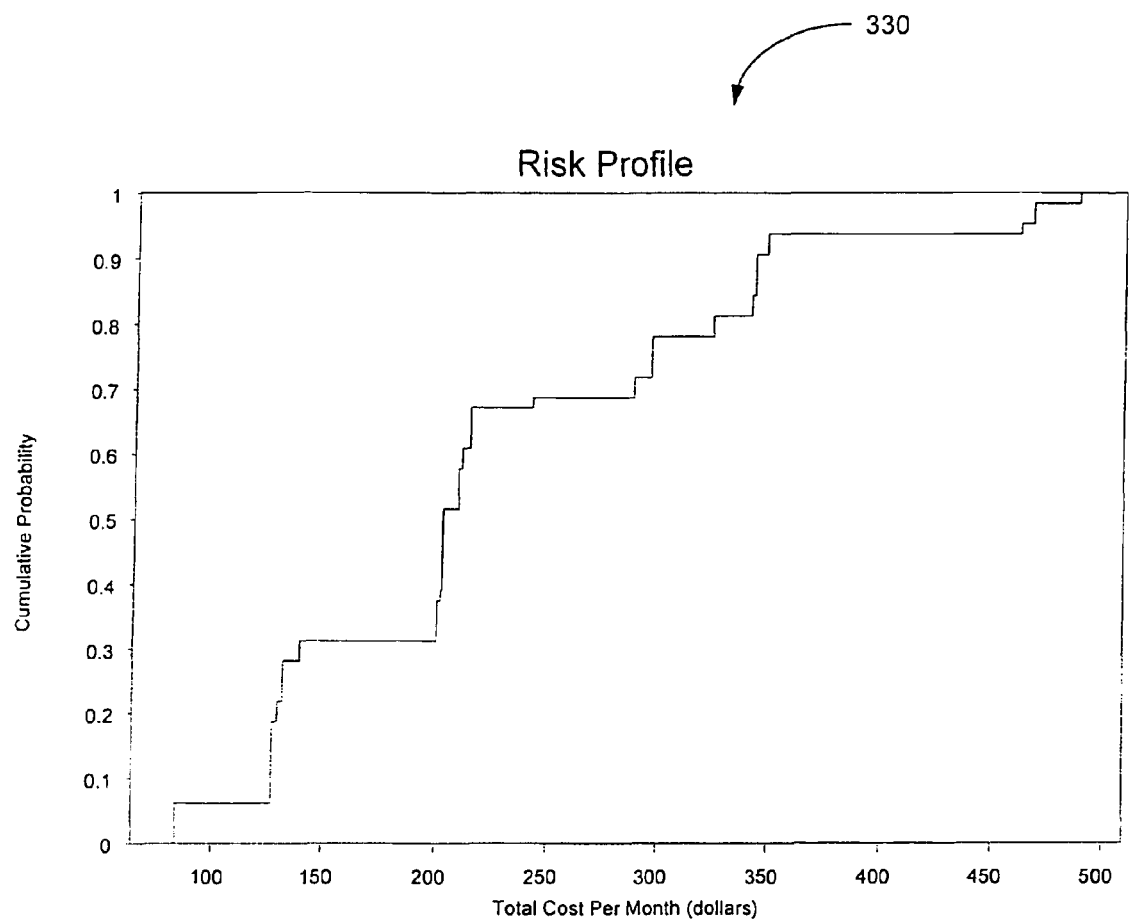
FIG. 3E is a risk profile, produced by the build component of FIG. 2, for the cellular service example shown in FIG. 3A.

FIG. 3E shows a risk profile graph 330, preferably created at step S136 of FIG. 3A. The risk profile graph 320 shows the probability distribution that represents the system's prediction of Total Cost Per Month based on the user inputs. The predicted Total Cost per Month ranges between $60 and $485 in the example shown. The vertical axis shows the cumulative probability, or description of the likelihood of the cost being less than or equal to any point between $60 and $485.

Based on the information presented to the customer at step S136, the customer selects among the various alternatives. In the cellular service example shown in FIGS. 3A-3E, analog service provides the best overall value proposition to the customer. Thus, the customer would select analog service.

The buy component 130 preferably continues to monitor the customer to determine if the product or service chosen continues to be the best product or service for maximizing customer value. This is shown as step S138 in FIG. 3A. In the example shown in FIG. 3A, the buy component 130 will contact the customer when a better service becomes available. The buy component 130 will preferably also contact the customer periodically (e.g., every six months) to obtain updated information from the customer about their cellular phone usage pattern, in order to determine if the selected service continues to provide the customer with the greatest value.

Prior systems for self-service buying applications have black-box recommendation engines that either focus on the product attributes and features that buyers desire or are not limited to a buyer's input. In contrast, the buy component 130 of the present invention interacts with users in terms of their values and needs. The buy component 130 provides users with the information they need to understand how their values and needs influence the choice recommended by the buy component 130. The buy component 130 allows users to evaluate custom alternatives around such criteria as pricing, packaging, promotion, quantities, shipment method, warranties, service levels, and guaranteed availability.

Figure 4:
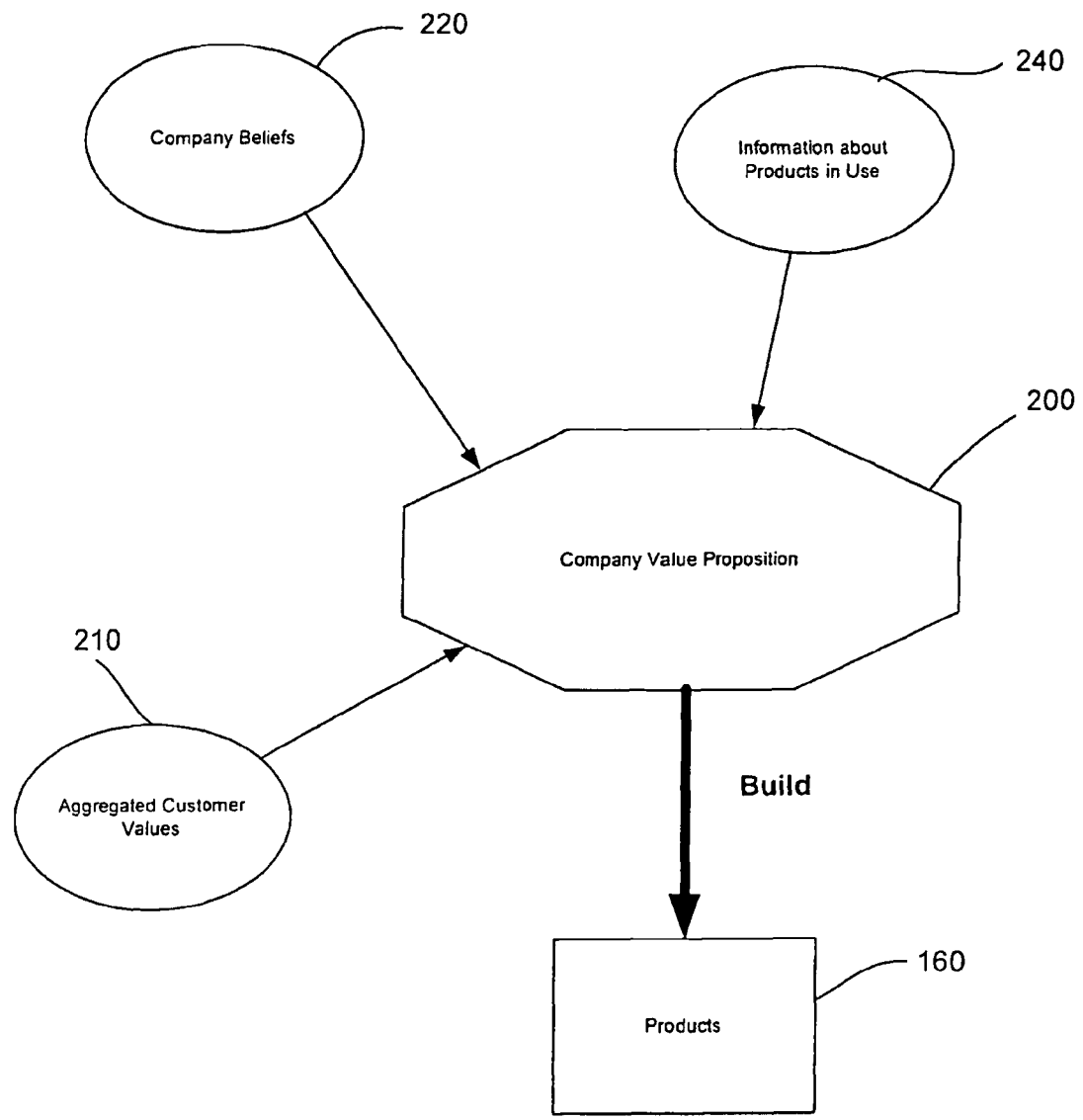
FIG. 4 is a schematic diagram of an object-oriented analytical model used for the build component of FIG. 1.

FIG. 4 is a schematic diagram of a preferred object-oriented analytical model used by the build component 150 to help builders determine what products 160 to build. The model determines a company value proposition 200 based on aggregated customer values 210, company beliefs 220, and Information about Products in use 240.

Aggregated customer values 2 10 preferably comprises aggregated information about the values of customers that can be used to help predict revenues for products 160 that are being considered.

Company beliefs 220 preferably comprises information regarding will cost the company to offer a product and information about potential revenues. Examples include the company's manufacturing costs, cost of capital, prediction of future market size, etc. The company beliefs may be inputs by the user or company data that may be modified by the user to fit the particular product situation.

The variables 210, 220 and 240 can be forecasts, ranges, and/or historical information from data sources. Furthermore, the information is preferably gathered and represented by probability distributions to reflect the uncertainty in the information. The distribution may be represented in its probabilistic mathematical form, by a discrete number of points that represent the probability distribution, or presented as a single point that represents the entire distribution.

Figure 5A:
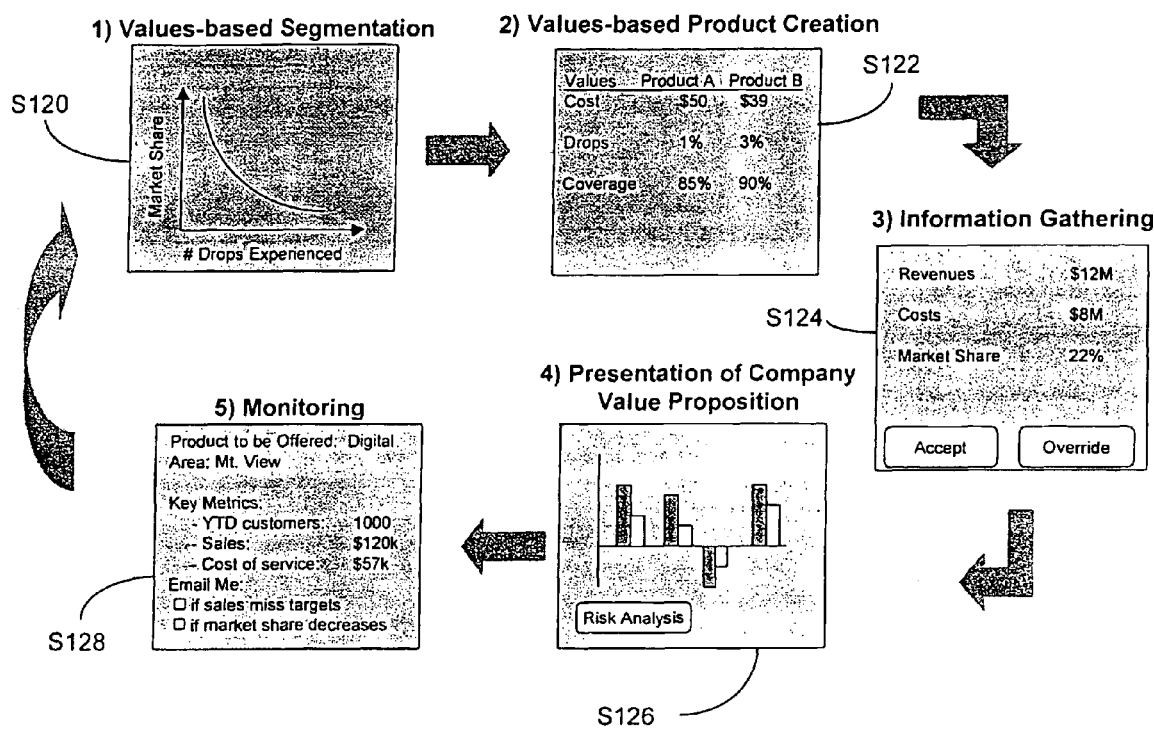
FIG. 5A is a diagram showing an example of steps that may be taken by the build component in assisting companies in a "build decision" for cellular service.

FIG. 5A is a diagram of an example of steps taken by the build component 120 in assisting companies in a "build decision" (product offerings, features, price, promotion, packaging, warranties, service levels, etc.). Each step in FIG. 5 is illustrated as a sample screen presented to the user.

In the example shown in FIG. 5A, the decision 160 is whether to rollout digital service in Mountain View, Calif. In step S120 (values-based segmentation), demographic data for customers who would use service in Mountain View is combined with the Aggregated Customer Values 210 to predict the number of people in Mountain View who will purchase digital service, or the market share. For example, using standard conjoint analysis, the customer value related to the number of dropped calls they experienced can be used to predict market share based on how many drops people are experiencing with a given technology. The market share is then presented to the user with other measures of financial impact in step S124.

In step S122 (values-based product creation) the user defines potential services to offer, and the build component 120 calculates attributes of value for each potential service. In the example shown in FIG. 5A, the attributes of value calculated are cost, drops (% of total calls dropped) and coverage provided (% of total service area covered).

In step S124 information regarding the financial impact of the potential products being evaluated is determined and presented to the user. This financial impact information comprises the Company Beliefs 220, and is based, in part, on the information provided by the user in step S122. The build component 120 preferably presents Company Beliefs 220 on revenues, costs, and market dynamics. The user can accept the Company Beliefs 220, or modify them based on the specific situation of rolling out service in Mountain View.

As discussed above, the company beliefs 220, the aggregated customer values 210, and the information about products in use 240 are used in determining the company value proposition 200. In the example used in FIG. 5A, the company value proposition 200 is a business model that calculates the profitability of the product being evaluated (e.g., digital service in Mountain View). In step S126, the company value proposition 200 is presented, preferably as:

(1) a measure of return on investment, such as Net Present Value (NPV) over 10 years; and (2) a set of standard decision analysis graphical outputs. The standard decision analysis graphical outputs preferably comprise a components of value chart, a tornado chart, and a risk profile graph, such as the ones shown in FIGS. 5B, 5C and 5D, respectively.

Figure 5B:
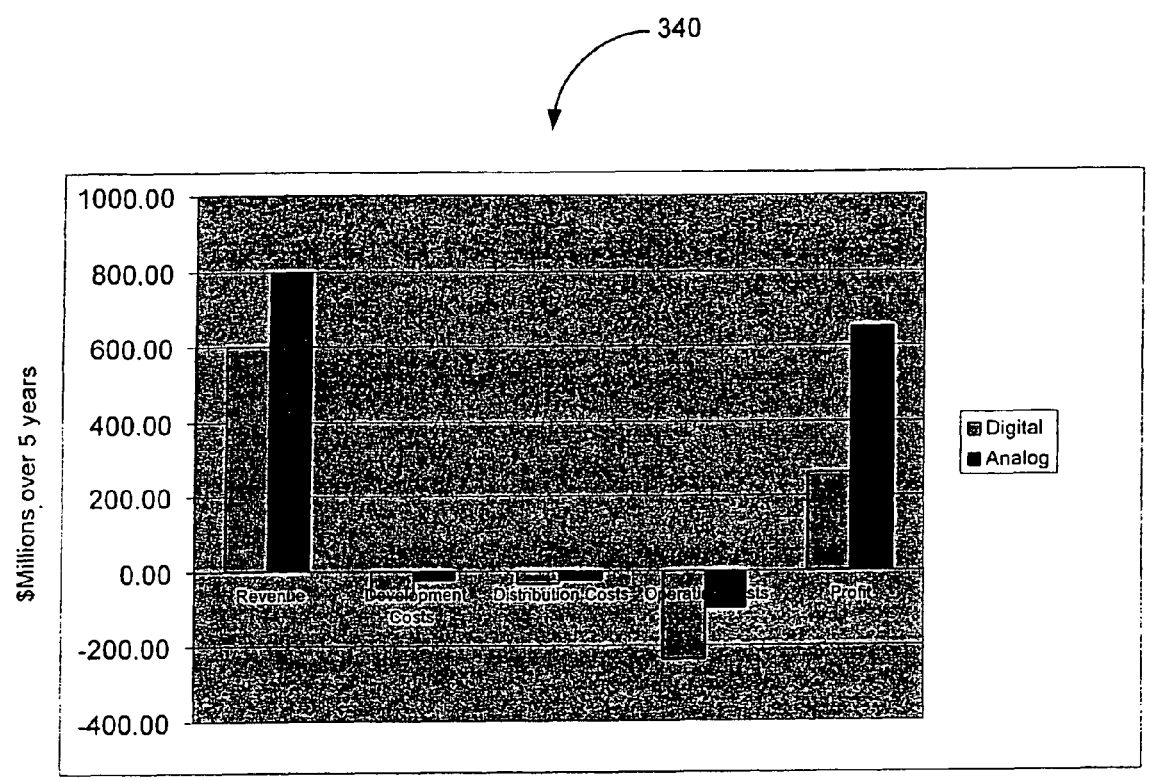
FIG. 5B is a components of value chart, produced by the build component of FIG. 4, for the cellular service example shown in FIG. 5A.

The separate components of value shown in the components of value chart 340 of FIG. 5B are preferably revenue, development costs, distribution costs, operating costs and profit for each of the proposed cellular service plans.

Figure 5C:
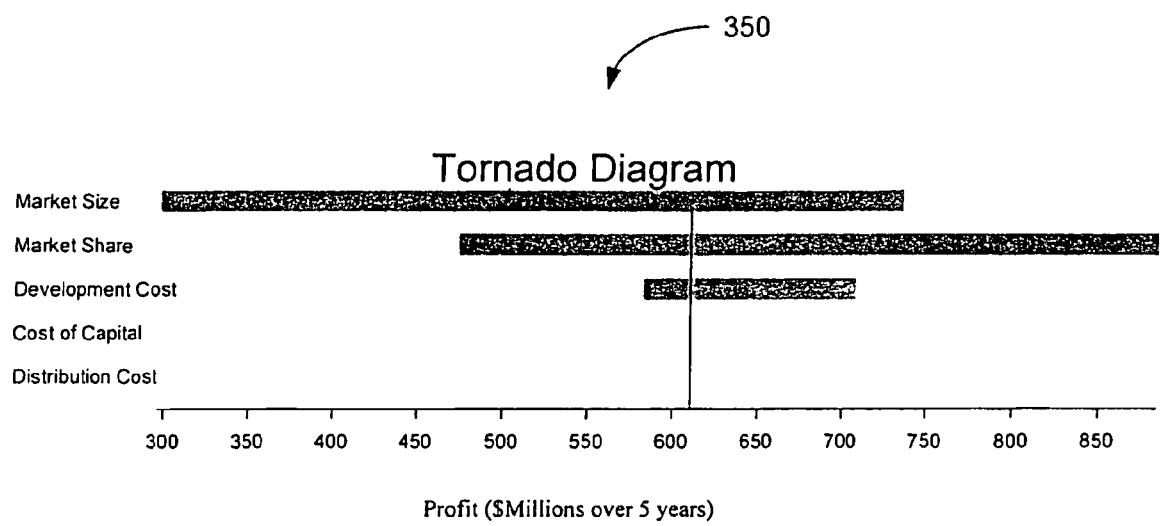
FIG. 5C is a tornado chart, produced by the build component of FIG. 4, for the cellular service example shown in FIG. 5A.

The tornado diagram 350 shown in FIG. 5C preferably shows how Profit varies over a range of values of the variable. The diagram indicates that the range of uncertainty for Market Size and Market Share impact total Profit the most.

Figure 5D:
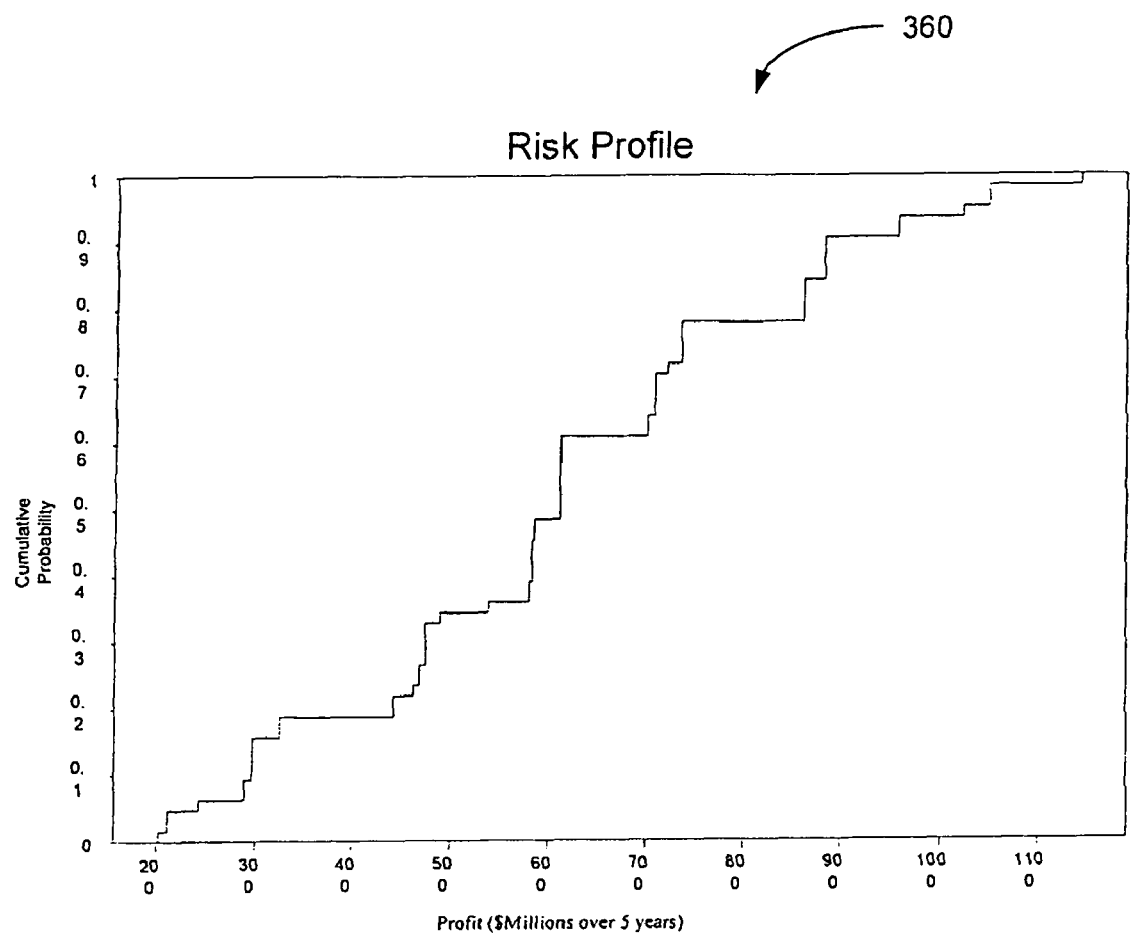
FIG. 5D is a risk profile, produced by the build component of FIG. 4, for the cellular service example shown in FIG. 5A.

The risk profile graph 360 shown in FIG. 5D preferably shows the probability distribution that represents the systems prediction of Profit based on the user inputs. The predicted Profit ranges from $200 Million to $1200 Million.

In step S128 of FIG. 5A (Monitoring), the rollout of the digital service in Mountain View is monitored by the build component 120, Metrics such as sales, customers, and costs are preferably tracked. The user can define milestones: such as sales targets, and the build component 120 preferably notifies the user when these milestones are missed or met.

Prior art systems for product offering decisions are general-purpose business 15 performance management products that measure return on investment and that track organizational performance for corporate investments or activities. These prior art systems typically take a long time to implement and modify, and use inferred customer expectations. In contrast, the build component 150: (1) reduces implementation time by providing packaged object-oriented analytical models; (2) improve decision accuracy by utilizing actual vs. inferred customer values and needs; and (4) allows companies to prioritize investments to get the best possible corporate return.

Figure 6:
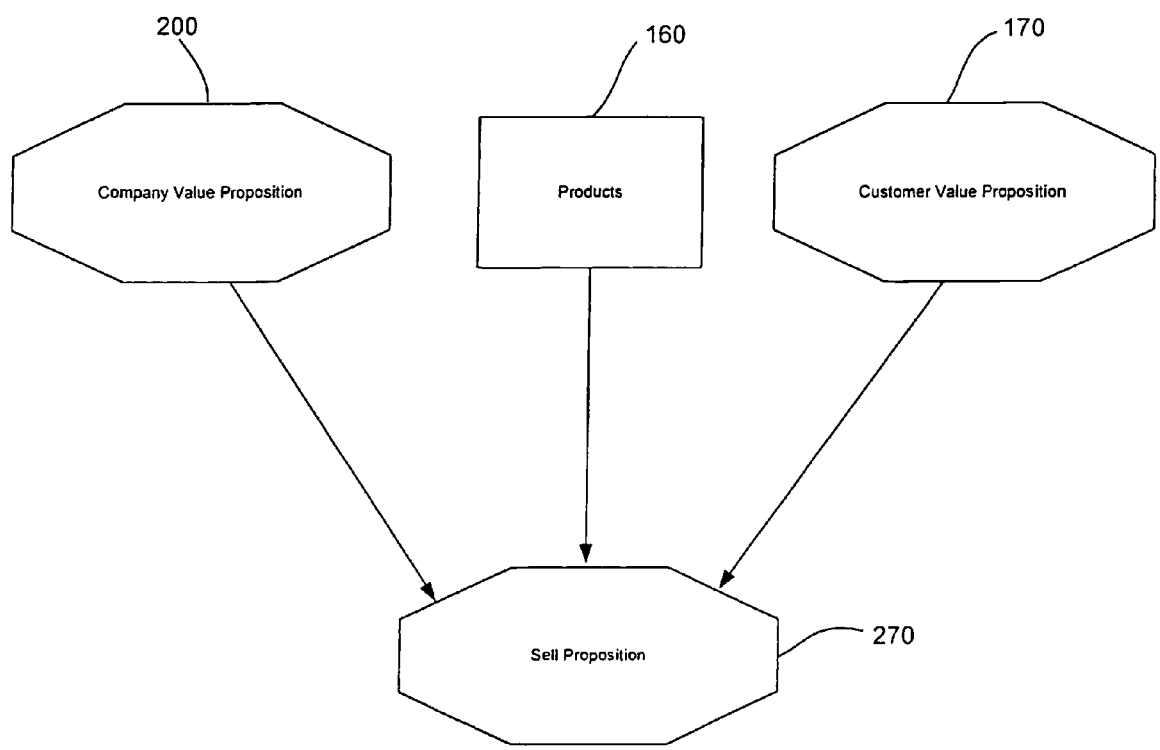
FIG. 6 is a schematic diagram of an object-oriented analytical model used for the sell component of FIG. 1.

FIG. 6 is a schematic diagram of an object-oriented analytical model used for the sell component 140 shown in FIG. 1. As discussed above, the sell component 140, is used to help company service representatives (CSRs) and automated online service centers offer products 160 to customers that will improve customer value and/or company value. The model determines a sell proposition 270 based on the company value proposition 200, the products 160 and the customer value proposition 170.

Figure 7:
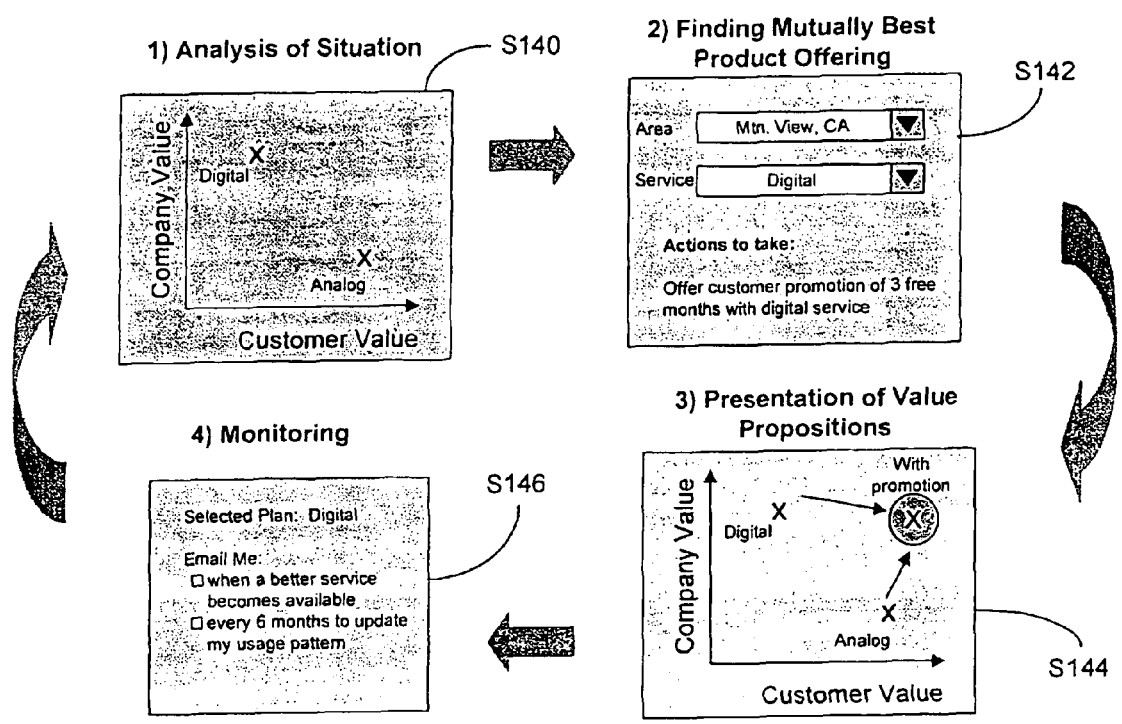
FIG. 7 is a diagram showing an example of steps that may be taken by the sell component in assisting company service representatives and automated online service centers offer products to customers.

FIG. 7 is a diagram of sample steps taken by the sell component 140 in assisting company service representatives and automated online service centers offer products to customers. In the example shown in FIG. 7, the alternative product offerings are analog and digital cellular service. Each step in FIG. 7 is illustrated as a sample screen presented to the user.

In step S140, the customer value proposition 170 and the company value proposition for the alternative product offerings of analog and digital service are displayed on a chart for the service representative. The service representative can then see that the analog service is of higher value to the customer, whereas the digital service is of higher value to the company.

In step S142, the service representative interacts with the customer to conduct a quick analysis to determine if a product offering will provide higher value, to either the customer, the company or both, than the choice to go with analog service. Based on the information gathered from the customer, the sell component will inform the sell representative what promotional options he is allowed to offer to the customer.

For purposes of illustration, assume the service representative discovers that the customer values analog service because digital coverage is incomplete in the customer's area, and that the service representative is informed that digital service will be made available in the customer's area shortly. In this scenario, the sell component 140 informs the service representative that he is allowed to offer three free months of digital service to the customer while the digital coverage is improved in the customer's area.

In step S144, the customer chooses among the product offerings. The three free months of digital service enhances the customer value for digital service. The value proposition for the customer on this alternative is higher than that for analog service, so the customer is more likely to choose digital service (with the three free months) over analog service.

The sell component 140 preferably continues to monitor the customer to determine if the product or service chosen continues to be the best product or service for maximizing customer value. This is shown as step S146 in FIG. 7. In the example shown in FIG. 7, the sell component 140 will contact the customer when a better service becomes available. The sell component 140 will preferably also contact the customer periodically (e.g., every six months) to obtain updated information from the customer about their cellular phone usage pattern, in order to determine if the selected service continues to provide the customer with the greatest value.

Prior art systems for on-line selling applications employ a structured programming approach that utilize rules-based engines. The rules-based engines utilize a fixed set of outcomes, and take a long time to implement. In contrast, the sell component 140 allows company CSRs and automated online service centers to: (1) compare alternatives that maximize company profits alongside those that maximize individual customer value; (2) identify areas where further dialogue could provide a choice that improves customer satisfaction; and (3) reduce implementation and modification time due to the object-oriented models used.

Figure 8:
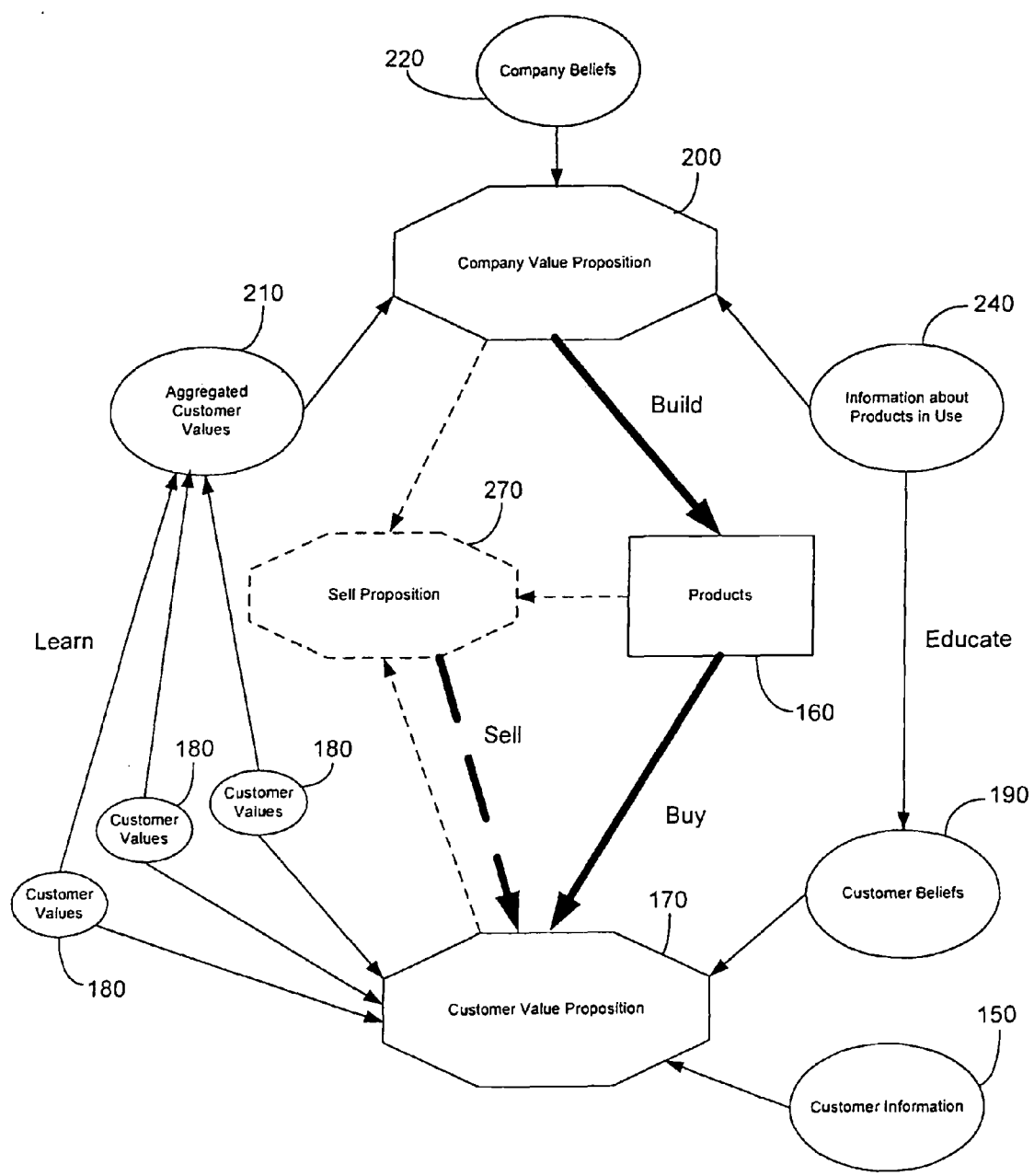
FIG. 8 is a schematic diagram representation of the flow of information in an integrated build-to-buy decision analysis method, in accordance with the present invention.

Because object-oriented analytical models are used, all of the individual components that make up the demand component 110, and all of the individual components that make up the supply component 120 can be integrated into a closed-loop system. FIG. 8 is a schematic diagram representation of the flow of information in an integrated build-to-buy decision analysis system and method, in accordance with a preferred embodiment of the present invention. FIG. 8 illustrates how the various analytical models discussed above can be interconnected to obtain an integrated build-to-buy system.

As discussed above, the customer value proposition 1 70 is formulated based on customer information 150, customer values 180 and customer beliefs 190. The company learns about the customer values 180 over time and accumulates this knowledge about the entire market as aggregated customer values 210. The aggregated customer values 210 are then used as part of the basis for forming the company value proposition 200. Company beliefs 220 and information about products in use 240 also form part of the basis for the company value proposition 200. Information on products already in use 240 can also be used to educate potential customers and change customer beliefs 190.

As discussed above, the company value proposition 200 is used to determine what products 160 to build. The customer value proposition 170 is used by the customer to determine which of the products 160 to buy.

The sell proposition 270 comes into play if the company utilizes CSRs or online service centers to help the customer make a final buy decision. If these are used, the sell proposition 270 is obtained based on the company value proposition 200, information on the products available for purchase 160, and the customer value proposition 170. As discussed above, the sell proposition 270 is one that maximizes both customer and company value. Using the sell proposition 270, the CSR seeks to improve both company and customer value.

As discussed above, the object-oriented analytical models described above are preferably implemented using an object-oriented programming language, such as Java™, C++, and Smalltalk. The present invention is preferably implemented as an Internet-based system and method. Thus, the various components of the present invention are preferably implemented on a server, which may be or include, for instance, a work station running the Microsoft Windows™ NT™, Windows™ 2000, UNIX, LINUX, XENIX, IBM, AIX, Hewlett-Packard UX™, Novel™, Sun Micro Systems Solaris™, OS/Z™, BeOS™, Mach, Apache Open Step™, Apple OS X™ or other operating system or platform. However, the various components of the present invention could also be implemented on a programmed general purpose computer, a special purpose computer, a programmed microprocessor or microcontroller and peripheral integrated circuit elements, an ASIC or other integrated circuit, a hardwired electronic or logic circuit such as a discrete element circuit, a programmable logic device such as a FPGA, PLD, PLA, or PAL, or the like. In general, any device on which a finite state machine capable of implementing the object-oriented analytical models illustrated in FIGS. 1-8 can be used to implement the present invention.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims

What is claimed is:

1. A computer-implemented decision analysis system that facilitates decision, the system comprising:
    one or more processors configured to execute computer program modules, the computer program modules comprising:
        a first module configured to create a demand component comprising at least one demand-oriented, values-based decision analysis component, the demand component being based on:
            i) a set of product characteristics and qualities;
            ii) a set of aggregated product demand values associated with a set of buyers and resulting from the set of product characteristics and qualities, and a quantifiable metric associated with each aggregated product demand value, wherein the individual aggregated product demand values are determined by aggregating corresponding product demand values of the different buyers in the set of buyers;
            iii) a set of aggregated buyer demand values associated with the set of buyers and predetermined for the set of buyers independent of the product characteristics and qualities, and a quantifiable metric associated with each aggregated buyer demand value in the set of aggregated buyer demand values, wherein the individual aggregated buyer values are determined by aggregating corresponding buyer demand values of the different buyers in the set of buyers;
            iv) a set of demand value tradeoffs indicating how the set of buyers would trade one aggregated product demand value for another aggregated product demand value;
            v) a set of demand information components, each defined in terms of a probability or a probability distribution; and
            vi) a set of buyer alternatives that represent at least one products the set of buyers are individually capable of purchasing;
        a second module configured to create a build component comprising at least one supply-oriented, values-based decision analysis component, the build component being based on:
            i) a set of product supply values associated with a seller and resulting from the set of product characteristics and qualities, and a quantifiable metric associated with each product supply value;
            ii) a set of seller supply values associated with the seller and determined for the seller independent of the product characteristics and qualities, and a quantifiable metric associated with each seller supply value;
            iii) a set of supply value tradeoffs showing how the seller would trade one product supply value for another product supply value;
            iv) a set of seller information components, each defined in terms of a probability or a probability distribution; and
            v) a set of seller alternatives that represent products the seller is capable of selling;
        a third module configured to combine the aggregated product demand values, the aggregated buyer demand values, the product supply values, the seller supply values, the demand value tradeoffs, the supply value tradeoffs, the buyer information components and the seller information components to evaluate risk and return characteristics of the buyer alternatives and the seller alternatives; and a fourth module configured to perform sensitivity analysis to show how the risk and return characteristics of the seller alternatives change as one or more of the aggregated product demand values, the aggregated buyer demand values the product supply values, the demand value tradeoffs, the supply value tradeoffs, the buyer information components or the seller information components change.

2. The system of claim 1, wherein the demand component, and the supply component each comprises at least one object-oriented analytical model that shows both graphically and mathematically how the aggregated demand values, the supply values, the buyer information components and the seller information components are related in order to calculate the demand value tradeoffs, the supply value tradeoffs, risk and return.

3. The system of claim 2, wherein each object-oriented analytical model collects user information, is further configured to assist individual users in the set of users in a commercial decision making process, and is able to share the user information with other object-oriented analytical models, wherein user information collected includes at least value assessments, value tradeoffs, probability assessments, alternatives considered, and alternatives selected.

4. The system of claim 1, wherein the product characteristics and qualities refer to the characteristics and qualities of a product that includes a good and/or a service.

5. The system of claim 1, wherein the build component is configured to assist a user in determining products to build.

6. The system of claim 1, wherein the build component comprises an object-oriented analytical model.

7. The system of claim 1, wherein a feedback loops is created so that demand information gathered by the demand component in the process of helping individual buyers in the set of buyers make purchase decisions is utilized by the supply component, and supply information gathered by the supply component in the process of helping the seller make or build products is utilized by the demand component.

* * * * *